H. ZIMMERMANN.
TUBE SHEET AND METHOD OF FORMING SAME.
APPLICATION FILED AUG. 11, 1915.
1,198,307.  Patented Sept. 12, 1916.
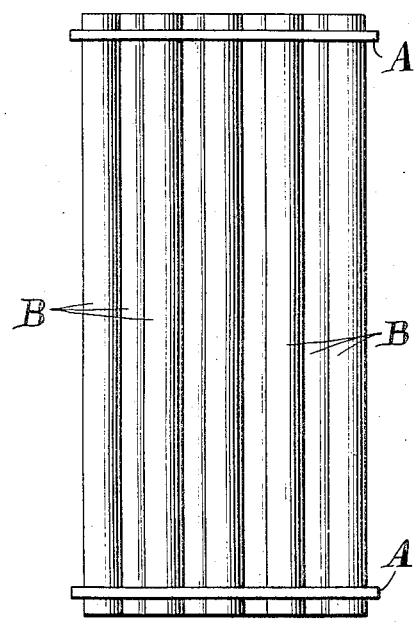
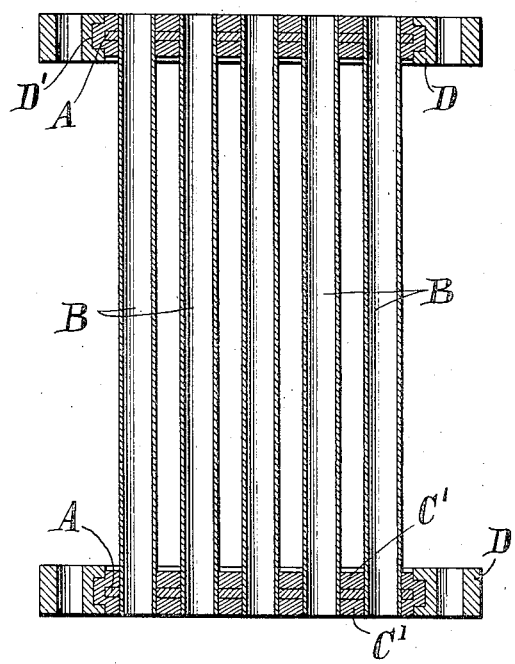
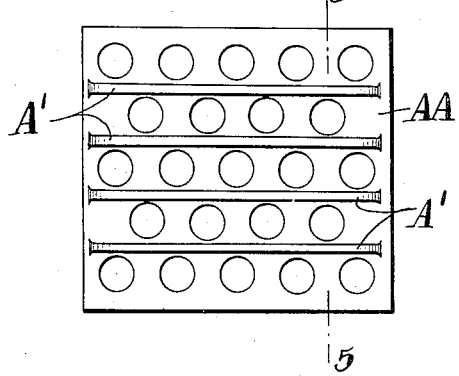
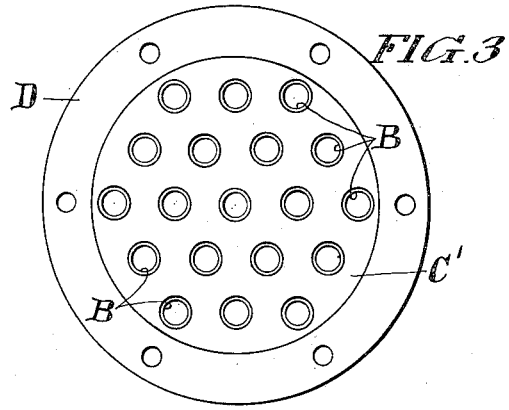
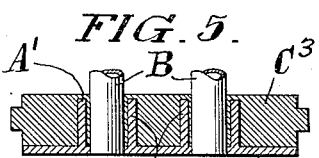
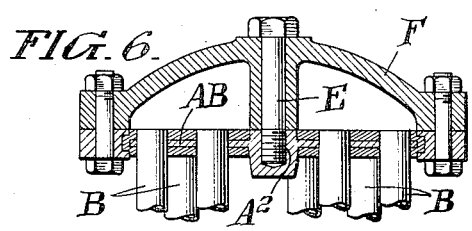
Inventor.
Hans Zimmermann
By Francis T. Chambers
Attorney
Witness
Daniel Webster, Jr.

UNITED STATES PATENT OFFICE.

HANS ZIMMERMANN, OF PHILADELPHIA, PENNSYLVANIA, ASSIGNOR TO SCHUTTE & KOERTING COMPANY, OF PHILADELPHIA, PENNSYLVANIA, A CORPORATION OF PENNSYLVANIA.

TUBE-SHEET AND METHOD OF FORMING SAME.

1,198,307.  Specification of Letters Patent.  Patented Sept. 12, 1916.

Application filed August 11, 1915. Serial No. 45,037.

*To all whom it may concern:*

Be it known that I, HANS ZIMMERMANN, a subject of the German Empire, residing in the city and county of Philadelphia, in the State of Pennsylvania, have invented certain new and useful Improvements in Tube-Sheets and Methods of Forming Same, of which the following is a true and exact specification, reference being had to the accompanying drawings, which form a part thereof.

My present invention relates to tubular heat exchanging apparatus of what may be called the surface condenser type, and comprises improvements in the structure of, and the method of forming the tube sheets or walls securing the tube ends in the proper spaced relation, and closing the ends of the intertube space.

The general objects of the invention are to improve the construction and facilitate, and cheapen the cost of construction of a satisfactory form of tube sheet or wall properly secured to the tube ends.

In carrying out my invention I make each tube sheet of laminated form, forming one or more layers of solder like metal cast upon the ends of the tubes and forming another layer of a plate of metal of higher melting point. Preferably, though not necessarily, the plate is embedded in the tube sheet with solder metal at each side.

My present improvement possesses certain distinct advantages over tube sheets formed wholly of solder like material cast upon the ends of the tubes which have heretofore been used on a commercial scale and found generally desirable. For one thing the thin metal plates which are drilled or punched to snugly receive the ends of the tubes frictionally hold the inserted tubes in accurately spaced relation and make it unnecessary to employ other spacing or bundling means to hold the tubes during the casting thereon of the cast metal body portion of the tube sheet. In the casting operation, the film like joints between the thin metal plate and the tube ends are filled by the cast metal, thus insuring an impervious tube sheet notwithstanding the not unusual presence of porous portions of the cast metal part of the tube sheet. Inasmuch as the tubes, thin plate, and frame or casing member at the periphery of the tube sheet may have the same or approximately the same coefficient of thermal expansion, the difference in the coefficients of expansion of the solder like tube sheet metal and the frame or casing member does not have the tendency which it otherwise would, to create leaky joints.

In the accompanying drawings I have illustrated, by way of example, various forms of apparatus constructed in accordance with my present invention.

Figure 1 is an elevation of a partially assembled tubular element; Fig. 2 is a sectional elevation of the same element in its finished form; Fig. 3 is a plan of the element shown in Fig. 2; Fig. 4 is a plan of a modified form of spacing plate; Fig. 5 is a section taken on the line 5—5 of Fig. 4 through the skeleton plate and cast metal portion of a tube sheet of which it forms a part; and Fig. 6 is a sectional elevation of a portion of apparatus embodying another form of spacing plate.

In the construction illustrated in Figs. 1, 2 and 3, there is embedded in each tube sheet an apertured plate A, ordinarily of brass. The plates have holes punched or drilled in them snugly receiving the tubes which are ordinarily formed of brass or copper. Fig. 1 shows the assembled tubes B and spacing plates A. To form the finished tubular element of Figs. 2 and 3, the cast metal layers C' at one end are cast in place usually in a mold, downward into which, the ends of the tubes extend, and the layers C' are thereafter similarly formed at the opposite ends of the tubes. Ordinarily in each casting operation the mold also receives the ring D, of brass or the like, which forms the marginal edge of the finished tube sheet and is secured in place by the cast metal. Preferably the member D is formed with ribs as by cutting the groove D' therein to interlock with portions of the cast metal.

The thin metal spacing plates may be formed of sheet brass in which case the holes are usually punched, or they may be formed of cast metal in which case the holes may be drilled. When formed of cast brass or the like the spacing plates may have integral strengthening ribs A' as are shown on the cast metal plate AA of Figs. 4 and 5. As shown in Fig. 5 the cast metal C³ is all at one side of the body of plate AA.

When it is desirable to have a stay bolt or like connection to the tube sheets, such as is formed by the bolt E employed in Fig. 6 to connect the tube sheet to the casing member F, the spacing plate AB may be formed with a socket A² tapped to receive the connecting bolt. In all the forms illustrated the spacing plates contribute to the strength of the tube sheets and with the cast metal insures tight joints while the cast metal gives a desirable rigidity to the structure.

While in accordance with the provisions of the statutes I have illustrated and described the best forms of my invention now known to me, it will be apparent to those skilled in the art that changes can be made in the form of my invention without departing from its spirit, and that some features of my invention can be used without a corresponding use of other features of the invention.

Having now described my invention, what I claim as new and desire to secure by Letters Patent, is:

1. The method of providing a bundle of metal tubes with a tube sheet extending transversely to the tubes and holding the latter in spaced apart relation, which consists in forming a metal spacing plate apertured to receive the tubes and holding the inserted tubes in the desired relation, inserting the tubes in said plate, and casting on one or each side of said sheet a layer of metal having a melting point below that of said tubes and spacing plate, whereby the cast metal gives rigidity to the tube sheet and seals the joints between said tubes and plates and said spacing plate forms a means for holding the tubes in their proper relation to one another during the casting operation.

2. In a tubular heat exchanging element, the combination with a bundle of spaced apart tubes of a tube sheet extending transversely to the tubes and comprising a spacing sheet apertured to receive the inserted tubes and one or more layers of metal of lower melting point than said sheet and tubes cast on said spacing sheet and sealing the joints between the latter and tubes.

3. In a tubular heat exchanging element, the combination with a bundle of spaced apart tubes of a tube sheet extending transversely to the tubes and comprising a spacing sheet apertured to receive the inserted tubes, one or more layers of metal of lower melting point than said sheet and tubes cast on said spacing sheet and sealing the joints between the latter and tubes, and a frame member of metal of higher melting point than said cast metal secured in place by the latter and forming the marginal edge of the tube sheet.

4. In a tubular heat exchanging element, the combination with a bundle of spaced apart tubes of a tube sheet extending transversely to the tubes and comprising a spacing sheet apertured to receive the inserted tubes and one or more layers of metal of lower melting point than said sheet and tubes cast on said spacing sheet and sealing the joints between the latter and tubes, said sheet being formed with provisions for connecting said tube sheet to an adjacent object.

HANS ZIMMERMANN.